United States Patent [19]
Hamano et al.

[11] Patent Number: 5,622,528
[45] Date of Patent: Apr. 22, 1997

[54] ENDOSCOPE EXAMINATION SYSTEM FOR PROCESSING ENDOSCOPE PICTURE IMAGE

[75] Inventors: Masahiko Hamano, Hachioji; Yasuyuki Kaneko, Yokohama; Atsushi Amano, Hachioji; Kazufumi Takamizawa, Chōfu; Hideyuki Shoji, Hachioji; Toshiaki Nishikori, Sagamihara; Mutsumi Ōshima, Hachioji; Ken-ya Inomata, Mitaka, all of Japan

[73] Assignee: Olympus Optical Co., Ltd., Tokyo, Japan

[21] Appl. No.: 347,223

[22] Filed: Nov. 23, 1994

Related U.S. Application Data

[63] Continuation of Ser. No. 121,464, Sep. 16, 1993, abandoned, which is a continuation of Ser. No. 824,288, Jan. 23, 1992, abandoned.

[30] Foreign Application Priority Data

Jan. 25, 1991 [JP] Japan .................................. 3-007635

[51] Int. Cl.[6] .................................................. A61B 1/045
[52] U.S. Cl. ............................. 600/118; 600/101; 348/74
[58] Field of Search ..................................... 600/921, 101, 600/118; 348/65–76; 395/200, 500, 600, 650, 725

[56] References Cited

U.S. PATENT DOCUMENTS

| | | |
|---|---|---|
| 4,854,301 | 8/1989 | Nakajima . |
| 4,947,245 | 8/1990 | Ogawa et al. ............................ 358/98 |
| 5,003,532 | 3/1991 | Ashida et al. ........................... 370/62 |
| 5,029,016 | 7/1991 | Hiyama et al. .......................... 358/98 |
| 5,123,089 | 6/1992 | Beilinski et al. ....................... 395/200 |
| 5,138,701 | 8/1992 | Ohira et al. ............................ 395/200 |
| 5,374,965 | 12/1994 | Kanno ..................................... 348/71 |

Primary Examiner—Richard J. Apley
Assistant Examiner—John P. Leubecker
Attorney, Agent, or Firm—Armstrong, Westerman, Hattori, McLeland & Naughton

[57] ABSTRACT

An endoscope examination system of the present invention consisting of a centralized controlling apparatus, a plurality of auxiliary functioning apparatuses and a plurality of workstations. The centralized controlling apparatus comprises a computer which controls each of the auxiliary apparatuses or the like and a switching apparatus which controls a changeover of picture image information transmitted to the auxiliary functioning apparatuses. The plurality of auxiliary functioning apparatuses comprise a computer which exchanges control information with the computer of the centralized controlling apparatus and with the workstations, a switching apparatus which exchanges picture image information with the switching apparatus of the centralized controlling apparatus and with the workstations, and a VTR which records the picture image information. The workstations are provided with a computer which exchanges control information with the computer of the auxiliary functioning apparatuses or of the centralized controlling apparatus and a switching apparatus which exchanges picture image information with the switching apparatus of the auxiliary functioning apparatuses or of the centralized controlling apparatus.

5 Claims, 11 Drawing Sheets

5,622,528

ENDOSCOPE EXAMINATION SYSTEM FOR PROCESSING ENDOSCOPE PICTURE IMAGE

This application is a continuation of application Ser. No. 08/121,464 filed Sep. 16, 1993, which was a continuation of U.S. Ser. No. 07/824,288, filed Jan. 23, 1992, now abandoned.

BACKGROUND OF THE INVENTION

1. Field of the Invention

The present invention relates to an endoscope examination system composed of a plurality of picture image processing apparatuses having electronic scopes or the like.

2. Description of the Related Art

Recently, there has come into extensive use an endoscope (hereinafter scope or fiberscope) whereby an elongated insertable part is inserted into the body cavity to observe the internal organs in the body cavity or various treatments can be taken by using a treatment tool inserted into a treatment channel according to the demand.

Also, various kinds of electronic scopes have been proposed in which a solid state imaging device, such as a charge coupled device, is used as an imaging means. This type of electronic scope has higher resolution in comparison with a fiberscope and can easily record or reproduce a picture image. Also, this type of electronic scope has the advantage of enlarging a picture image or processing a picture image, such as comparison of two picture planes, with ease.

Furthermore, a TV camera with a built-in image means, such as a solid state imaging device, is fitted to an eyepiece part of the fiberscope, so that a picture image is displayed on a TV monitor.

The prior art is explained in reference to a diagram as follows.

As shown in FIG. 12, an endoscope examination system, having a TV camera fitted to the above mentioned fiberscope or having an electronic scope, consists of a plurality of main functioning apparatuses 152 which examine or treat by using endoscopes (not illustrated) and an auxiliary functioning apparatus 150 which processes picture image information obtained by the main functioning apparatuses 152.

This auxiliary functioning apparatus 150 has a plurality of picture image information processing apparatuses such as a picture image processing apparatus 160 which processes picture image information obtained by the main functioning apparatuses 152, for example, by enlarging the picture image or comparing two picture planes, a picture image storing apparatus which stores the picture image information, such as a VTR 158, and an output apparatus which outputs the above mentioned picture image information, such as a video printer 156. By a controlling apparatus 154, these plurality of picture image information processing apparatuses can be controlled.

Also, the above mentioned main functioning apparatuses 152 have a light source apparatus 164, a plurality of examination apparatuses such as a video processor 166, a photographing apparatus 170, a suction apparatus 168 and a cautery apparatus 172. By a centralized controlling apparatus 162, these apparatuses can be controlled. In the endoscope examination system formed in this way, a plurality of operators can perform endoscope examinations by using respective main functioning apparatuses 152. When a picture image information processing apparatus of the auxiliary functioning apparatus 150, such as the video printer 156 is used, the main functioning apparatuses 152 gain access to the auxiliary functioning apparatus 150, so that an endoscope examination may be conducted.

Also, when a plurality of the main functioning apparatuses 152 gain access to the picture image information processing apparatus of the same auxiliary functioning apparatus 150, the main functioning apparatuses 152 are selected by the controlling apparatus 154 in the auxiliary functioning apparatus 150 in accordance with a predetermined order of priority.

However, the auxiliary functioning apparatus 150 of the endoscope examination system in the prior art is formed from a plurality of picture image information processing apparatuses 160 and a plurality of controlling apparatuses 154 which controls these picture image information processing apparatus, as mentioned above. Thus, the auxiliary functioning apparatus 150 becomes large and is provided separately from the main functioning apparatuses 152, so that there is a problem in that an operator has difficulty at the endoscope examination in quickly obtaining necessary examination information in which picture images are processed.

SUMMARY OF THE INVENTION

An object of the present invention is to obtain an endoscope examination system wherein necessary processing apparatuses corresponding to a plurality of examination functioning apparatuses, respectively, can be disposed near the examination functioning apparatuses and the treatment and operation efficiency of an operator can be improved by dispersing and miniaturizing the functions of the processing apparatuses.

Another object of the present invention is to obtain an endoscope examination system wherein an operator can process various picture images on a small examination functioning apparatus in the same way as a former large processing apparatus by enabling each examination functioning apparatus to use an alternative processing apparatus by way of a centralized processing apparatus.

The endoscope examination system of the present invention has a plurality of main functioning apparatuses as an examination functioning means, an auxiliary functioning apparatus as processing means provided in the above mentioned main functioning apparatuses, respectively, for example, one auxiliary functioning apparatus corresponds to one of the main functioning apparatuses, and a centralized controlling apparatus which controls the auxiliary functioning apparatuses. In accordance with the predetermined order of priority, the centralized controlling apparatus can control the usage of the auxiliary functioning apparatuses by a request of each of the main functioning apparatuses.

BRIEF DESCRIPTION OF THE DRAWINGS

FIG. 1 illustrates the concept of the structure of an endoscope examination system.

FIG. 2 is a block diagram showing the endoscope examination system.

FIG. 3 is a flowchart explaining the whole operation of an A workstation.

FIG. 4 is a flowchart explaining VTR control operation of the A workstation.

FIG. 5 is a flowchart explaining the operation of a centralized controlling apparatus.

FIG. 6 is a flowchart explaining the operation of an A auxiliary functioning apparatus.

FIG. 7 is a diagram showing an example of the whole process of the endoscope examination system.

FIG. 8 is a diagram explaining an example of the usage of the endoscope examination system.

FIG. 9 is a diagram explaining a monitor picture plane used in the example of the usage of the endoscope examination system.

DETAILED DESCRIPTION OF THE PREFERRED EMBODIMENTS

Embodiments of the present invention will be stated in reference to the diagrams as follows.

Figure 1:
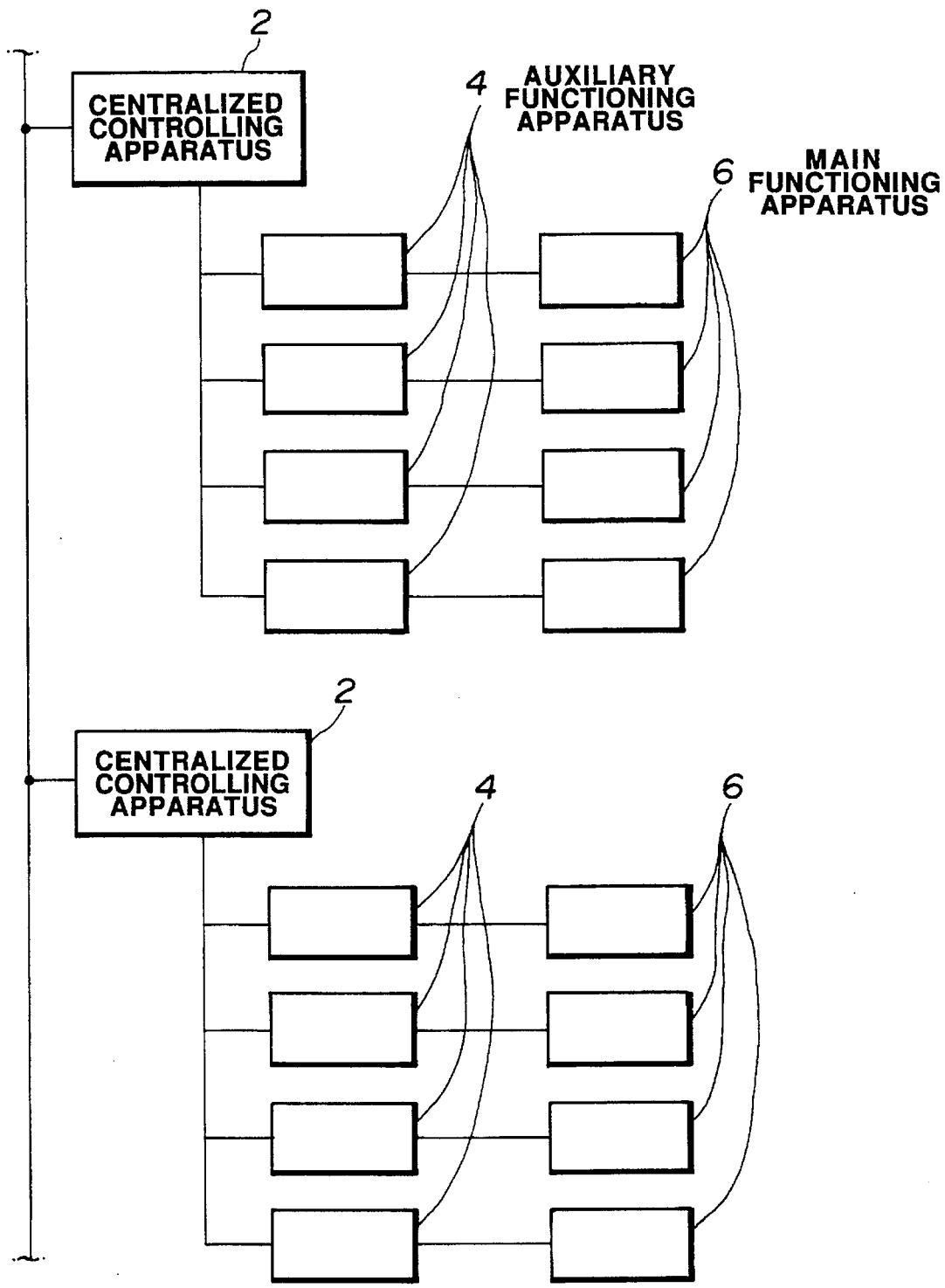
FIGS. 1 to 9 relate to the first embodiment.

As shown in FIG. 1, an endoscope examination system of the first embodiment contains a plurality of main functioning apparatuses 6 used as examination functioning means, auxiliary functioning apparatuses 4 used as processing means, provided in the above mentioned main functioning apparatuses 6 correspondently, for example, in a one-to-one ratio, respectively, and a centralized controlling apparatus 2 which controls the auxiliary functioning apparatuses 4. In the centralized controlling apparatus 2, the main functioning apparatuses 6 can control the usage of the auxiliary functioning apparatuses 4 by a request of each main functioning apparatuses 6.

Figure 2:
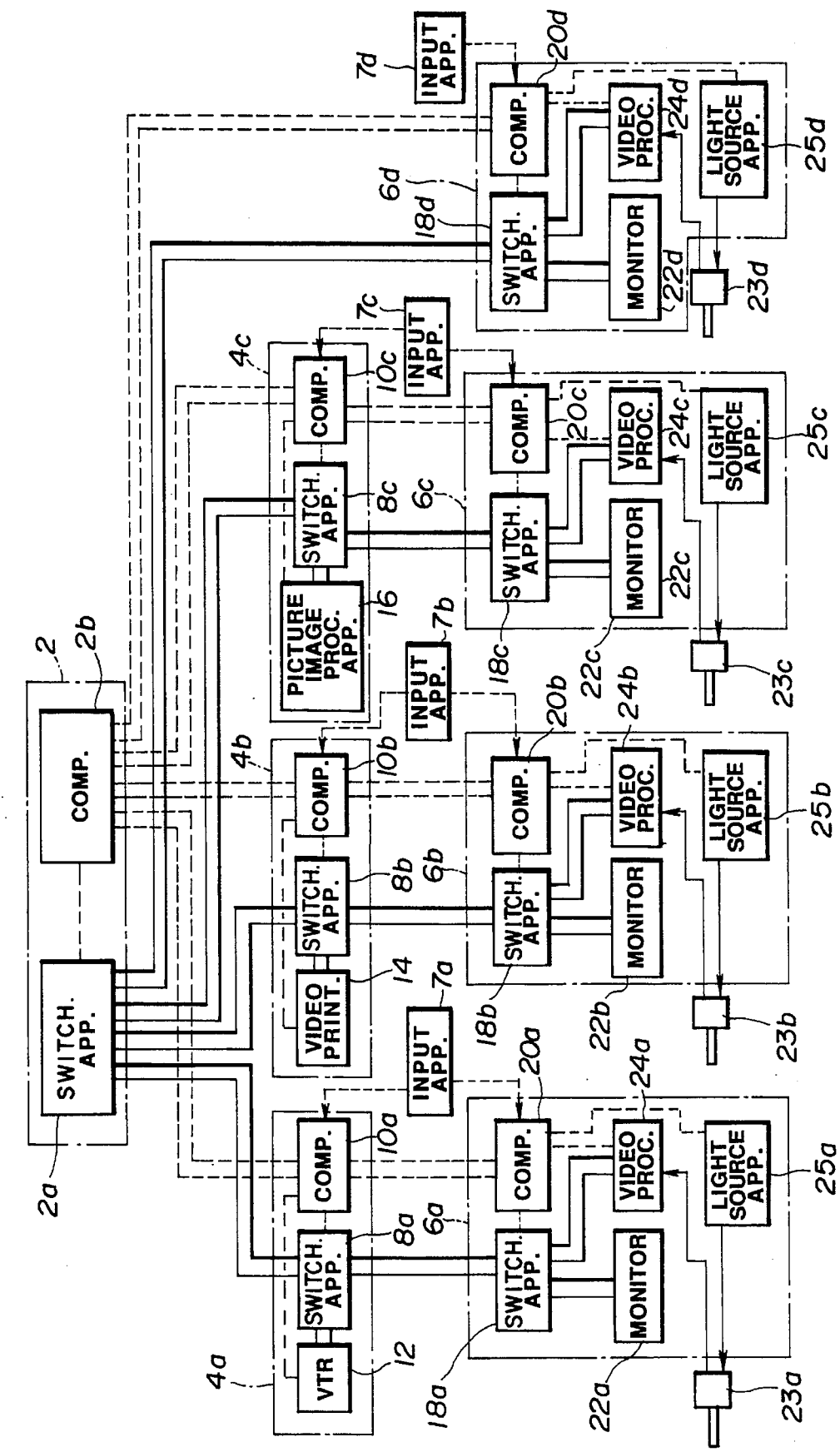

As shown in FIG. 2, the endoscope examination system in the first embodiment consists of, as mentioned above, the centralized controlling apparatus 2, a plurality of the auxiliary functioning apparatuses, for example, an A auxiliary functioning apparatus (AH, for short, hereinafter) 4a, a B auxiliary functioning apparatus (BH, for short, hereinafter) 4b and a C auxiliary functioning apparatus (CH, for short, hereinafter) 4c, and workstations as a plurality of main functioning apparatuses which correspond to the above mentioned plurality of auxiliary functioning apparatuses, that is, an A workstation (AW, for short, hereinafter) 6a corresponding to the AH 4a, a B workstation (BW, for short, hereinafter) 6b corresponding to the BH 4b, and a C workstation (CW, for short, hereinafter) 6c corresponding to the CH 4c and a D workstation (DWS, for short, hereinafter) 6d, where workstation DWS 6d is connected to the centralized controlling apparatus 2 without passing through the auxiliary functioning apparatus.

The centralized controlling apparatus 2 consists of a computer 2b which controls each of the auxiliary functioning apparatuses and the DWS 6d, and a switching apparatus 2a which controls a switching of picture image information transmitted to the auxiliary functioning apparatuses.

The above mentioned plurality of auxiliary functioning apparatuses, for example, the AH 4a consists of a computer 10a which exchanges control information with the computer 2b of the centralized controlling apparatus 2 and the AW 6a, a switching apparatus 8a which exchanges picture image information with the switching apparatus 2a of the centralized controlling apparatus 2 and a VTR 12 which records this picture image information. Also, the BH 4b consists of a computer 10b which exchanges control information with the computer 2b of the centralized controlling apparatus 2 and the BW 6b, a switching apparatus 8b which exchanges picture image information with the switching apparatus 2a of the centralized controlling apparatus 2 and the BW 6b, and a video printer 14 which prints out this picture image information on paper. Further, the CH 4c consists of a computer 10c which exchanges control information with the computer 2b of the centralized controlling apparatus 2 and the CW 6c, the switching apparatus 8c which exchanges picture image information with the switching apparatus 2a of the centralized controlling apparatus 2 and the CW 6c, and a picture image processing apparatus 16 which processes a picture image, for example, enlarges this picture image information and compares two picture image planes.

Each of the workstations, such as the AW 6a consists of a computer 20a which exchanges control information with the computer 10a, a switching apparatus 18a which exchanges picture image information with the switching apparatus 8a of the auxiliary functioning apparatus 4a, a light source apparatus 25a which supplies illuminating light to an endoscope 23a, a video processor 24a which produces picture image information transmitted to the switching apparatus 18a from an imaging signal from the endoscope 23a and a monitor 22a which displays the picture image information from the video processor 24a as a picture image through the switching apparatus 18a. Also, the BW 6b consists of a computer 20b which exchanges picture image information with the computer 10b, a switching apparatus 18b which exchanges picture image information with the switching apparatus 8b of the auxiliary functioning apparatus 4b, a light source apparatus 25b which supplies illuminating light to an endoscope 23b, a video processor 24b which produces picture image information transmitted to the switching apparatus 18b from an imaging signal from the endoscope 23b and a monitor 22b which displays the picture image information from the video processor 24b as a picture image through the switching apparatus 18b. Further, the CW 6c consists of a computer 20c which exchanges control information with the computer 10c, a switching apparatus 18c which exchanges picture image information with a switching apparatus 8c of the auxiliary functioning apparatus 4c, a light source apparatus 25c which supplies illuminating light to an endoscope 23c, a video processor 24c which produces picture image information transmitted to the switching apparatus 18c from an imaging signal from the endoscope 23c and a monitor 22c which displays the picture image information from the video processor 24c as a picture image through the switching apparatus 18c. Furthermore, the DWS 6d consists of a computer 20d which exchanges control information with a computer 2b of the centralized controlling apparatus 2, a switching apparatus 18d which exchanges picture image information with a switching apparatus 2a of the centralized controlling apparatus 2, a light source apparatus 25d which supplies illuminating light to an endoscope 23d, a video processor 24d which produces picture image information transmitted to the switching apparatus 18d from an imaging signal from the endoscope 23d and a monitor 22d which displays the picture image information from the video processor 24b as a picture image through the switching apparatus 18d.

In the computers 10a, 10b and 10c in the plurality of auxiliary functioning apparatuses or the computers 20a, 20b and 20c in the plurality of workstations, a device which indicates the processing contents, for example, input apparatuses 7a, 7b, 7c and 7d, such as a keyboard can be detachably connected. For example, the processing contents of a picture image can be indicated in an alternative auxiliary functioning apparatus or a workstation by these input apparatuses 7a, 7b, 7c and 7d.

Also, a solid line in the diagrams shows a flow of the picture image information and a broken line shows a flow of control information. Further, the picture image information is transmitted by, for example, the NTSC system.

The endoscopes 23a, 23b and 23c can be electronic endoscopes having a solid state imaging device, or endoscopes in which a TV camera can be connected to an eyepiece part.

Figure 3:
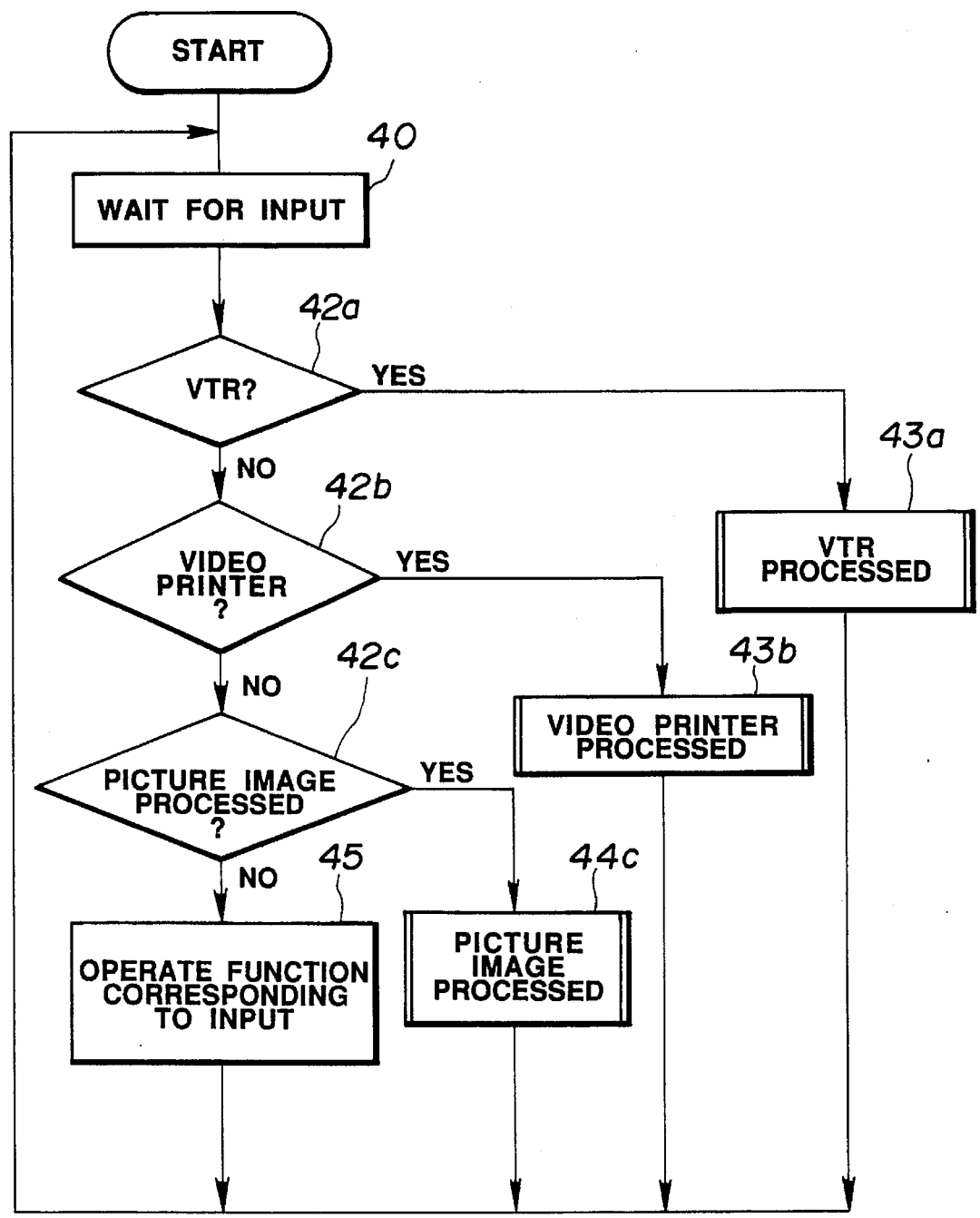

The operation of the endoscope examination system formed as shown above will be explained. In an endoscope examination, for example, the AW 6a, which is an examination functioning device of the endoscope examination system of the first embodiment, converts the imaging signal from the endoscope 23a into picture image information by the video processor 24a and processes the picture image information obtained as the need arises in accordance with the flowchart shown in FIG. 3.

That is, the computer 20a of the AW 6a waits for input of a process command at a step 40. An input process command is judged in steps 42a, 42b and 42c depending on the input command. A process command about the VTR 12 advances to a VTR process in a step 43a. A process command about the video printer 14 advances to a video printer process in a step 43b. A process command about the picture image processing apparatus 16 advances to a picture image process in a step 43c. In the situation in which the contents of a process command does not relate to the picture image information process, the process advances to a step 45 and makes the function corresponding to the input operate. When a series of the process completes, the process returns to the step 40 and waits for the input of the next process command.

Figure 4:
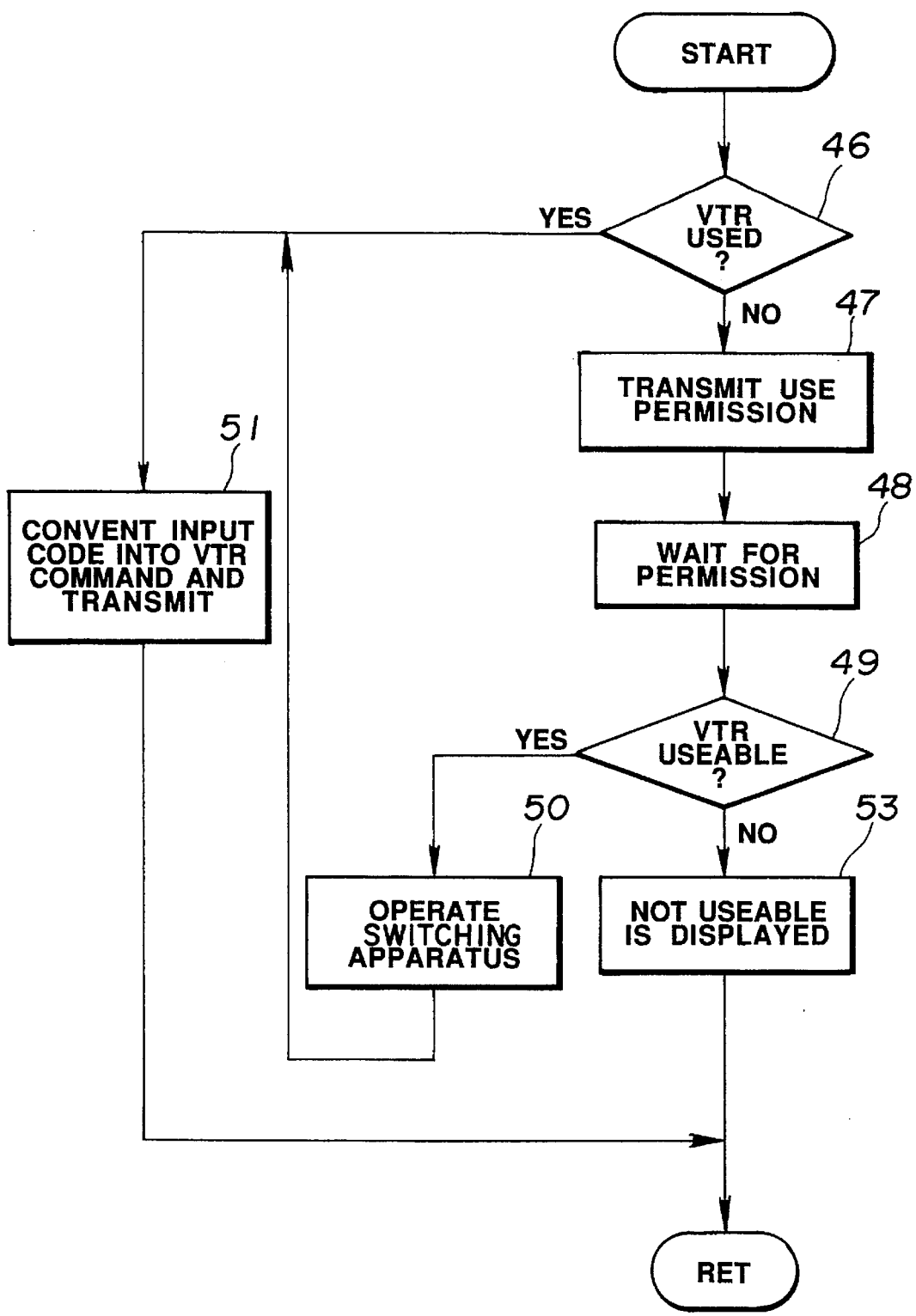

If a process command relates to, for example, the VTR 12, as shown in FIG. 4, the computer 20a of the AW 6a judges whether the AW 6a is using the VTR 12 at the moment or not at a step 46 in the VTR process at the step 43a. If the VTR 12 is not being used, a signal which requires the use permission of the VTR 12 is transmitted to the AH 4a at a step 47 and a permission signal from the AH 4a is waited for at a step 48. After the permission signal from the AH 4a is received, it is judged whether the VTR 12 can be used or not based on the permission signal from the AH 4a at a step 49. If it can be used, the process advances to a step 50 and makes the switching apparatus 18a operate so as to make the transmission of the picture image information possible. If it cannot be used, the process advances to a step 53 so as to display "not useable" on a display monitor 22a. When the AW 6a judges that the VTR 12 is being used at moment at the step 46, the judgement is converted into a control command and transmitted to the AH 4a in accordance with the input process command.

Figure 5:
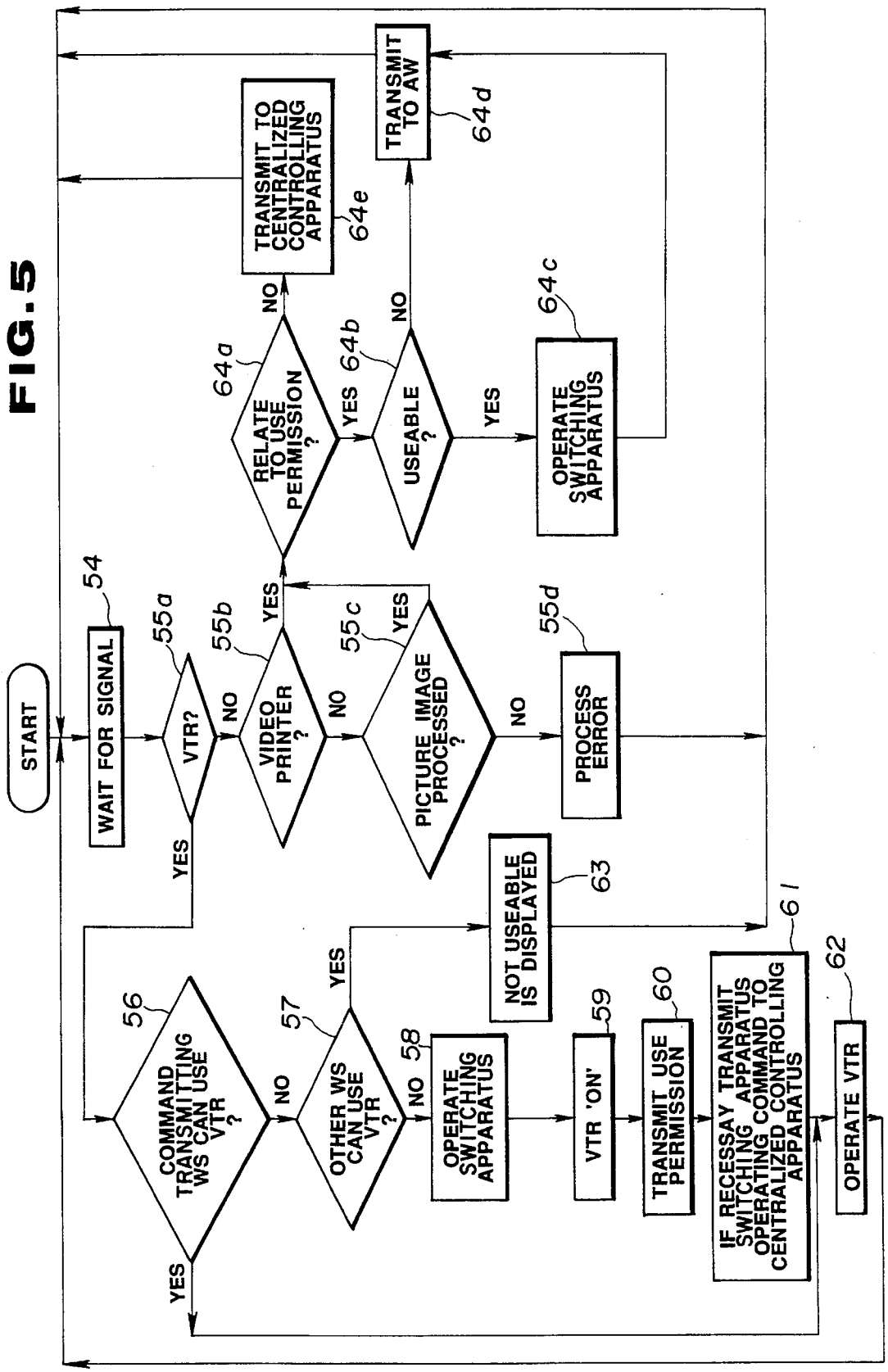

In accordance with the flowchart shown in FIG. 5, a process command signal from the centralized controlling apparatus 2 which transmits the VTR process command from the AW 6a and the other workstations BH 4b and CH 4c is waited for at a step 54. It is judged whether the process command relates to the VTR 12 or the video printer 14 or the picture image processing apparatus 16 or a switching apparatus at steps 55a, 55b and 55c. If the process command from the AW 6a relates to a video printer or a picture image process, a process command signal is transmitted to the centralized controlling apparatus 2. The process command about the centralized controlling apparatus 2 or the VTR 12 from the AW 6a advances to a step 56. Whether the corresponding workstation is using the VTR 12 or not at the moment is judged. If it is not being used, whether the VTR 12 can be used at a step 57 or not is judged. If it can be used, the switching apparatus 8a is operated at a step 58 so as to make the transmission of the picture image information possible. Further, the VTR 12 is ON to be useable at a step 59. A use permission signal is transmitted to the corresponding workstation at a step 60. If it is necessary to operate the switching apparatus 2a of the centralized controlling apparatus 2 at a step 61 (when passing through the centralized controlling apparatus 2), a command is transmitted to the centralized controlling apparatus 2. In accordance with the control command signal at a step 62, the VTR 12 is operated. Also, when the corresponding workstation is using the VTR 12 at the moment, the process advances to a step 62 from the step 56.

Also, the AW 6a was explained as a workstation by using the AH 4a as an auxiliary functioning apparatus; however, similar control is provided when the other workstations BW 6b and CW 6c and the auxiliary functioning apparatuses BH 4b and CH 4c are used, as well.

Figure 6:
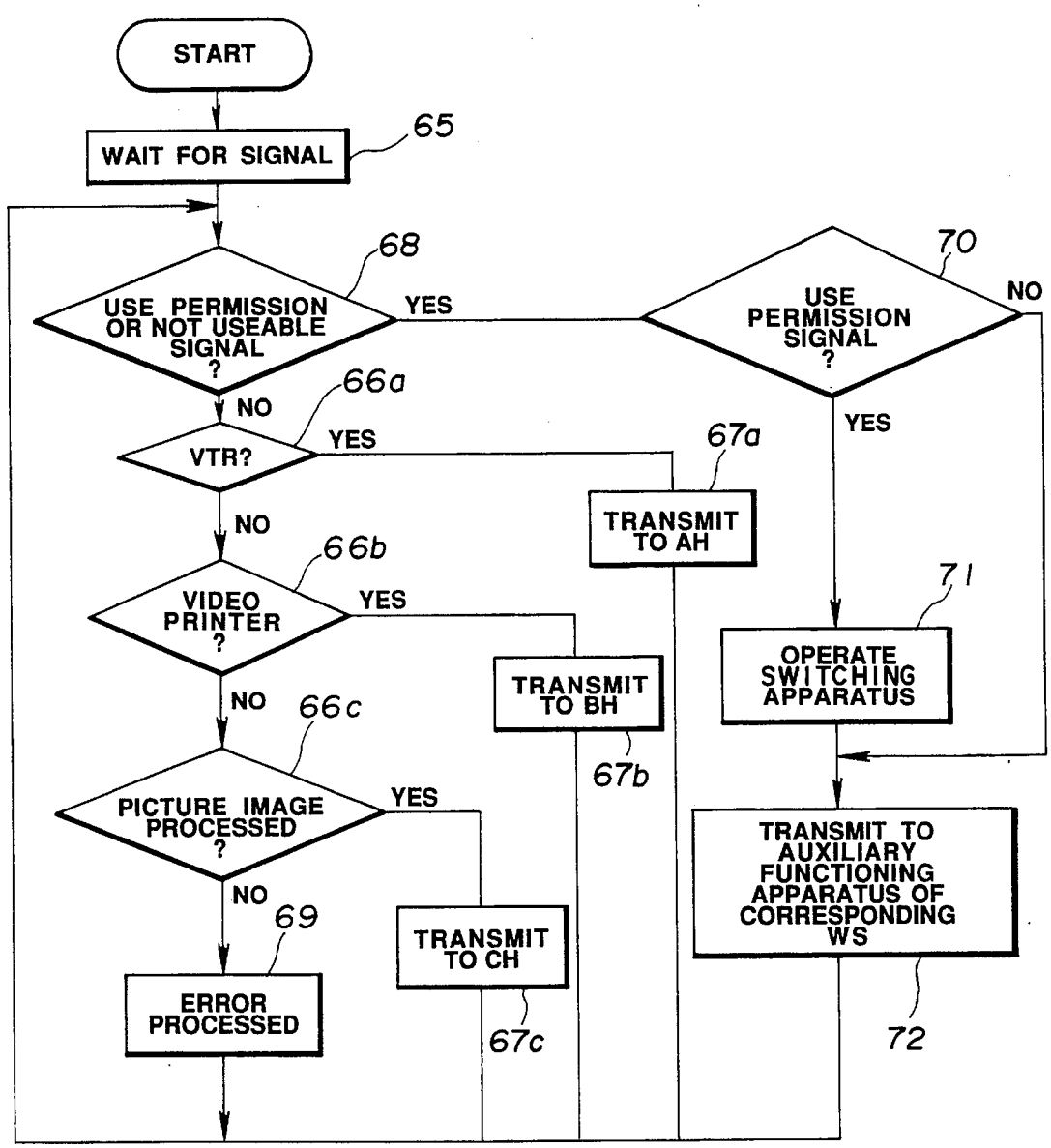

The computer 2b of the centralized controlling apparatus 2 waits for a process command signal from each workstation and each auxiliary functioning apparatus at a step 65 as shown in FIG. 6 and processes the signal in accordance with the contents of the process command. In the case of a use permission signal, a switching apparatus is operated at a step 71 and the signal is transmitted to the auxiliary functioning apparatus corresponding to the workstation (WS) which requests the use permission at a step 72. If it cannot be used, the process advances to the step 72 and the signal, just as it is, is transmitted to the auxiliary functioning apparatus corresponding to the workstation (WS). The other signals about the VTR 12 are transmitted to the AH 4a, the signals about the video printer 14 is transmitted to the BH 4b and the signals about the picture image processing apparatus is transmitted to the CH 4c.

Also, in the order of use priority of each workstation of the processing apparatus, such as a VTR of each auxiliary functioning apparatus, the workstation corresponding to the auxiliary functioning apparatus is the first to be used and then, the other workstations are used in access order.

In the first embodiment, only the transmission of a video signal is mentioned and the system of this invention is explained. In addition to a video signal, various information in a hospital (such as a data of a patient) can be delivered.

Figure 7:
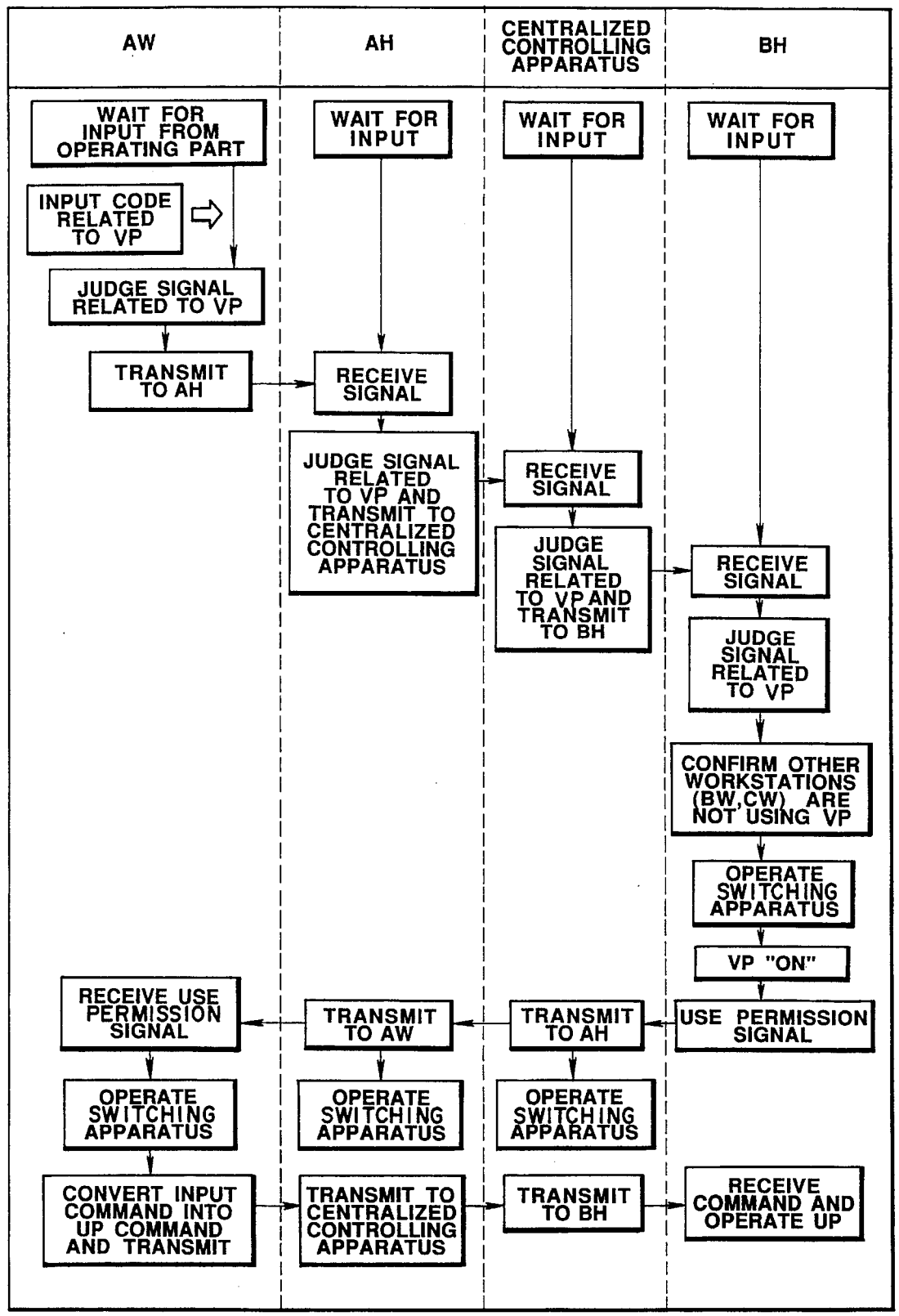

As an example of the whole flow process, the process in which the AW uses a video printer of the BH is shown in FIG. 7.

Figure 8:
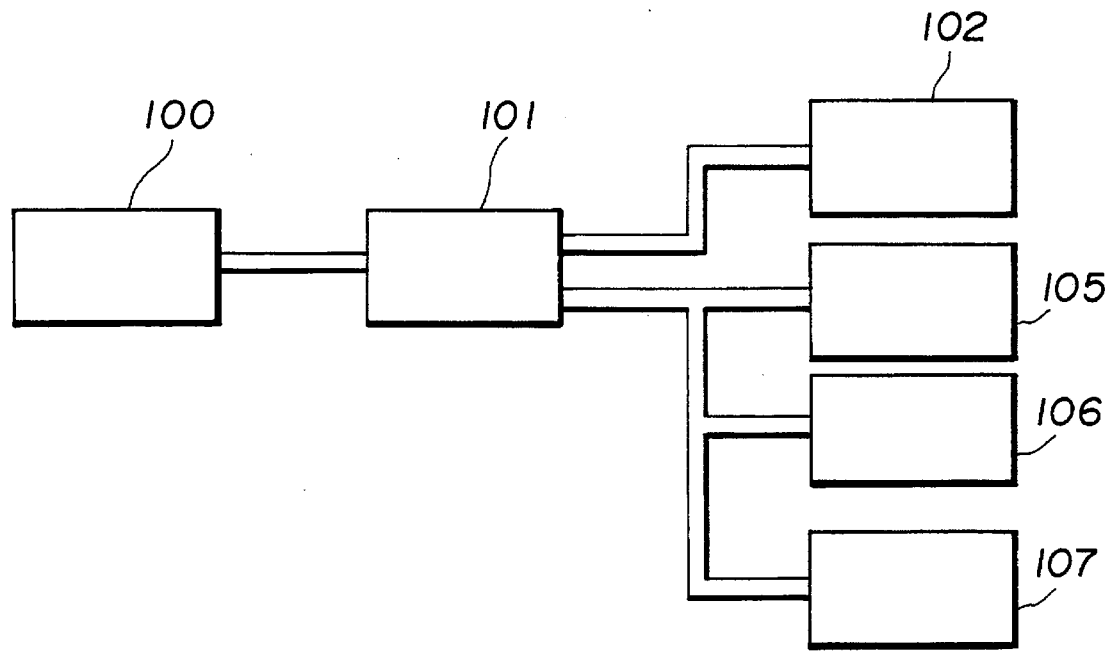

As shown in FIG. 8, the computer corresponding to each workstation, such as a computer 101 of the workstation 100, is connected to a supervisory warning apparatus for the degree of saturation with oxygen in blood 102, a bed vibrator 105, a voice output apparatus 106 and an oxygen inhalation apparatus 107.

Figure 9:
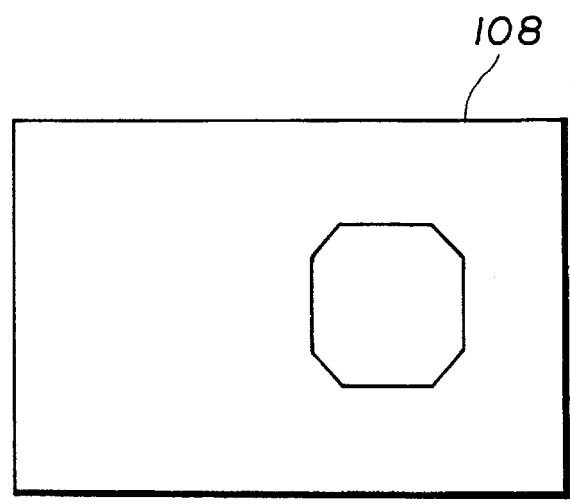

The supervisory warning apparatus for the degree of saturation with oxygen in blood 102 detects that the degree of saturation with oxygen in blood of a patient decreases and that the patient is near a faint condition. Thus, the apparatus 102 supplies a warning on a monitor picture plane 108 shown in FIG. 9 and, for example, blinks the warning letters. Accordingly, doctors and nurses notice that the patient is in danger, so that they can take appropriate measures for the patient.

In the endoscope examination system of the first embodiment formed in this way, the functions of each auxiliary functioning apparatus are scattered and miniaturized. Therefore, required auxiliary functioning apparatuses which correspond to a plurality of workstations, respectively, can be disposed near the workstations. Thus, the operating efficiency of the treatment of an operator can be improved. Further, because each workstation can use the other auxiliary functioning apparatuses by the centralized controlling apparatus, the operator can perform various picture image processes on the workstations as the same way as in a former large auxiliary functioning apparatus.

Figure 10:
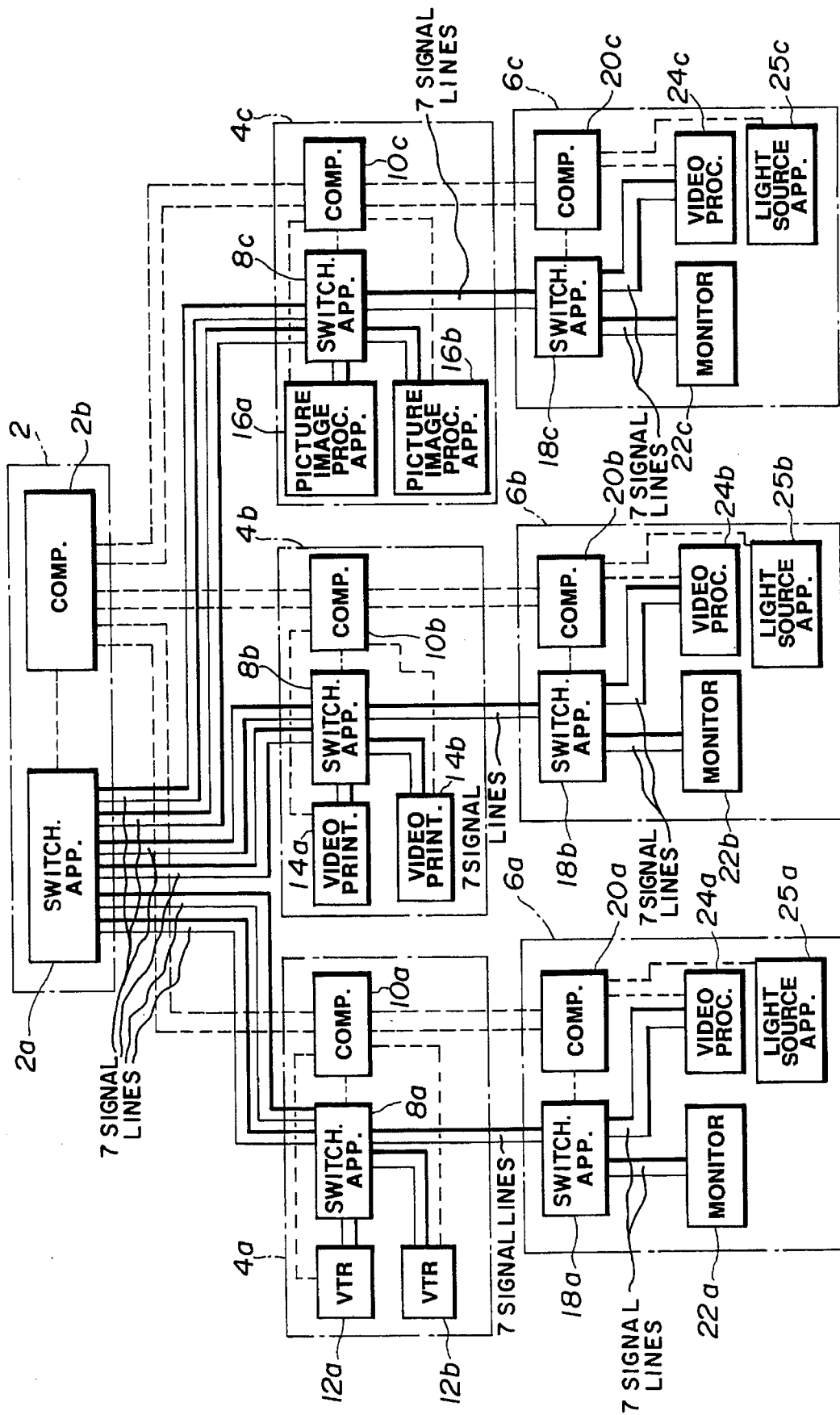
FIG. 10 relates to the second embodiment of the structure of the endoscope examination system.

In an endoscope examination system of the second embodiment, picture image information is transmitted by seven signal lines in all, which are a signal line for the NTSC system, four signal lines for RGB and two signal lines for YC as shown in FIG. 10. Thus, each auxiliary functioning apparatus is provided with a plurality of processing apparatuses, for example, two VTRs 12a and 12b in the AH 4a, two video printers 14a and 14b in the BH 4b and two picture image processing apparatuses 16a and 16b in the CH 4c. Since the system is formed in this way, each functioning apparatus can simultaneously process the picture image in a plurality of workstations.

The other structure, operation and effect are the same formation as in the first embodiment.

Figure 11:
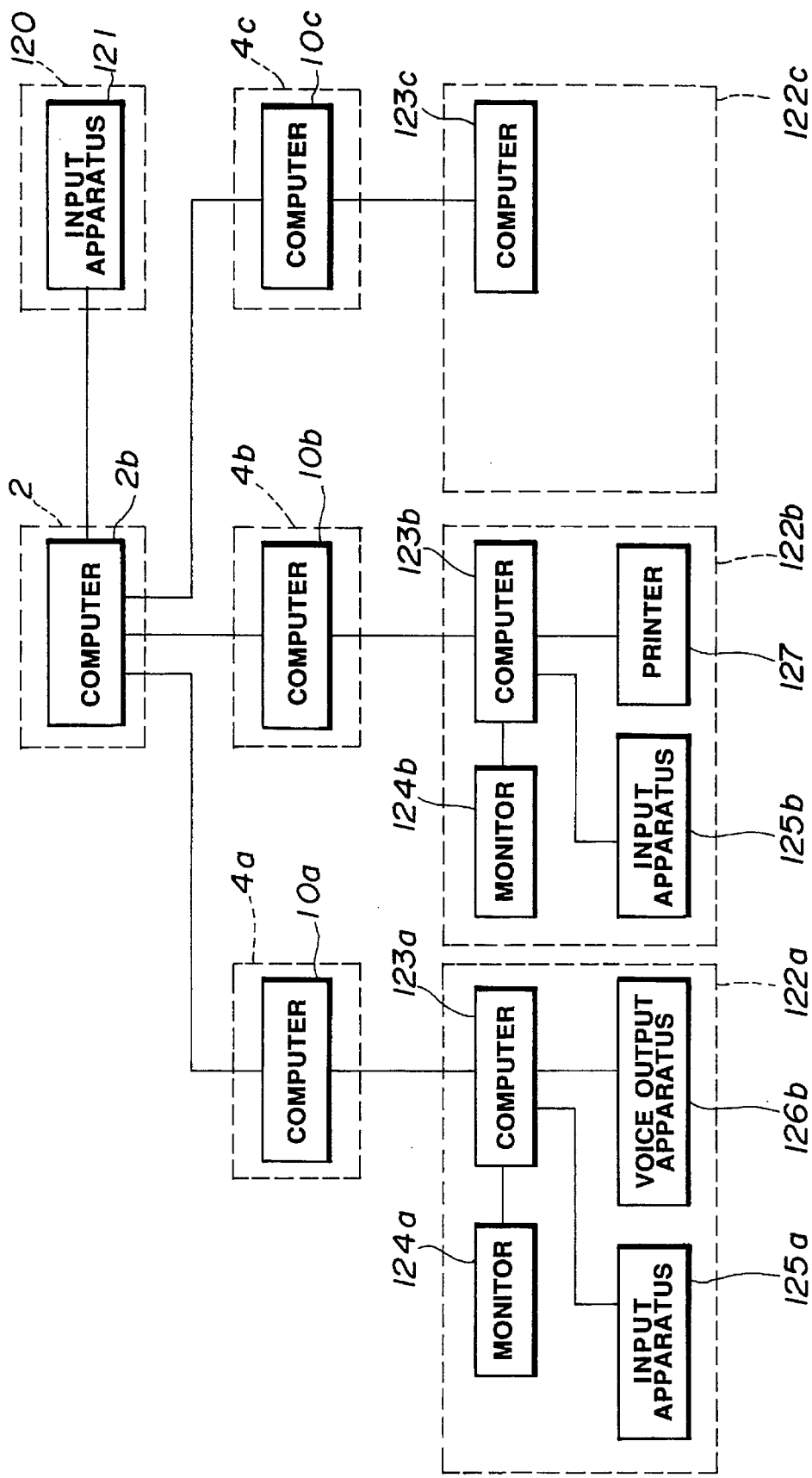
FIG. 11 is a block diagram showing an endoscope examination system related to the third embodiment.
Figure 12:
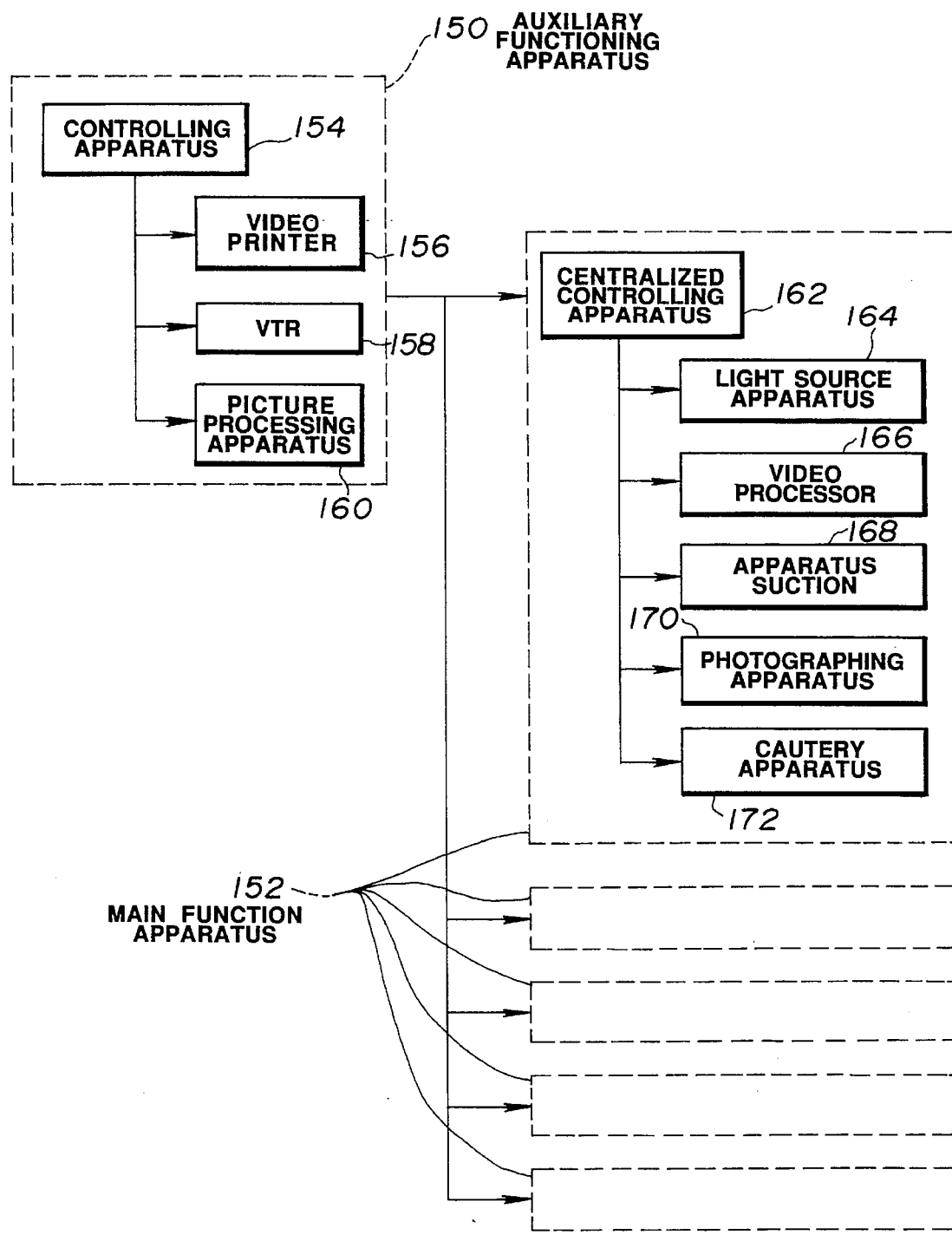
FIG. 12 illustrates the concept of the structure of an endoscope examination system related to the prior art.

As shown in FIG. 11, an AW 122a, a BW 122b and a CW 122c are provided as workstations of the endoscope examination system of the third embodiment. An input apparatus 125a for a keyboard or the like, a monitor 124a and a voice output apparatus 126b are connected to a computer 123a of the AW 122a. Also, an input apparatus 125b for a keyboard or the like, a monitor 124b and the printer 127 are connected to a computer 123b of the BW 122b. Further, an input and output apparatus (not illustrated) is connected to a computer 123c of the CW 122b.

The centralized controlling apparatus 2 of the endoscope examination system of the third embodiment is connected to a pre-processing apparatus 120 in a pre-processing room (not illustrated) which is different from an examination room (not illustrated) where the endoscope examination is carried out. In the pre-processing apparatus 120, a previous treatment history of a patient or the like is supplied by an input apparatus 121.

The other structure is the same formation as in the first embodiment.

In the endoscope examination system of the third embodiment formed in this way, a patient data, such as a treatment history of each patient is read in a computer 2b in the centralized controlling apparatus 2 by the pre-processing apparatus 120. This patient data is input and operated from the input apparatus in the workstation being used by a doctor, so that the computer 2b in the centralized controlling apparatus 2 determines necessary pre-treatment for the patient before the endoscope examination. Therefore, appropriate pre-treatment information is sent to the workstation and displayed on the monitor of the workstation.

As a result, the doctor can confirm whether an appropriate pre-treatment has been given to the patient or not in an instant, so that the efficiency of the endoscope examination can be improved and the examination will be safer.

Further, after the endoscope examination, matters that require attention after the examination should be told to the patient. However, in the case of the endoscope examination using the AH 122a, the matters are automatically given to the patient in accordance with the command of the computer 123a in the AH 122a by the voice output apparatus 126b. Also, in the case of the endoscope examination using the BH 122b, the matters are automatically printed out in accordance with the command of the computer 123b in the BH 122b by a printer 127.

As a result, the doctor can instantly confirm whether an appropriate pre-treatment has been given to the patient, so that the efficiency of the endoscope examination can be improved and will be safer. Also, it prevents a nurse from forgetting to tell the matters that require attention to the patient. Thus, the examination becomes safer and the operation of a nurse can be reduced at the same time.

The other operation and effect are the same formation as in the first embodiment.

In this invention, it is apparent that working modes different in a wide range can be formed on the basis of this invention without deviating from the spirit and scope of the invention. This invention is not restricted by its specific working mode except being limited by the appended claims.

What is claimed is:

1. An endoscope examination system comprising:

a plurality of endoscope systems including at least an endoscope body which is inserted into a cavity to obtain a picture image within the cavity as an electric signal, light-source means for supplying illuminating light to an endoscope in order to illuminate the interior of said cavity, a video processing means for processing a picture image signal from said endoscope to convert the picture image signal to a signal which is adequate for monitor observation, and a monitoring means for displaying the processed signal;

a switching means electrically connected to said plurality of endoscope systems, for enabling said picture image signal to be transmitted from any one of said endoscope systems to another of the remaining said endoscope systems;

a plurality of recording/processing means each provided within one of said endoscope systems for recording or processing said endoscope picture image, wherein each said recording/processing means performs a different function for each said endoscope system; and control means electrically connected to said plurality of endoscope systems and said switching means for sending out an operation control signal to said plurality of endoscope systems and said switching means and enabling any one of said endoscope systems to control the recording/processing means of another one of said endoscope systems.

2. An endoscope examination system according to claim 1, wherein said control means includes input means for inputting the control signal into the respective systems.

3. An endoscope examination system according to claim 1, wherein one of said recording/processing means comprises a VTR.

4. An endoscope examination system according to claim 1, wherein one of said recording/processing means comprises a printer.

5. An endoscope examination system comprising:

a plurality of endoscope systems including at least an endoscope body which is inserted into a cavity to obtain a picture image within the cavity as an electric signal, light-source means for supplying illuminating light to an endoscope in order to illuminate the interior of said cavity, a video processing means for processing a picture image signal from said endoscope to convert the picture image signal to a signal which is adequate for monitor observation, and a monitoring means for displaying the processed signal;

a plurality of recording/processing means each provided within one of said endoscope systems for recording or processing said endoscope picture image, wherein each said recording/processing means performs a different function for each said endoscope system; and control means electrically connected to said plurality of endoscope systems for sending out an operation control signal to said plurality of endoscope systems for enabling said picture image signal to be transmitted from any one of said endoscope systems to another one of said endoscope systems and enabling any one of said endoscope systems to control the recording/processing means of another one of said endoscope systems.

* * * * *